United States Patent [19]
Arisaka

[11] Patent Number: 5,249,063
[45] Date of Patent: Sep. 28, 1993

[54] INFORMATION SIGNAL PROCESSING DEVICE FOR OFFSET REMOVAL AND SIGNAL IDENTIFICATION OF COLOR DIFFERENCE SIGNALS

[75] Inventor: Katsumi Arisaka, Kanagawa, Japan

[73] Assignee: Canon Kabushiki Kaisha, Tokyo, Japan

[21] Appl. No.: 785,273

[22] Filed: Oct. 30, 1991

[30] Foreign Application Priority Data

Nov. 2, 1990 [JP] Japan .................................. 2-297613

[51] Int. Cl.$^5$ ............................................ H04N 9/80
[52] U.S. Cl. ...................................... 358/316; 358/34; 358/171
[58] Field of Search ................... 358/34, 171, 75, 909, 358/310, 312, 317, 316

[56] References Cited

U.S. PATENT DOCUMENTS

| | | |
|---|---|---|
| 4,396,466 | 1/1983 | Matsuzaki et al. ................... 358/170 |
| 4,403,254 | 9/1983 | Okada et al. .......................... 358/171 |
| 4,617,590 | 10/1986 | Dann ..................................... 358/34 |
| 4,651,213 | 3/1987 | Takimoto ............................. 358/172 |
| 4,766,485 | 8/1988 | Takayama ............................ 358/34 |
| 4,821,087 | 4/1989 | Honjo ................................... 358/34 |

Primary Examiner—Mark R. Powell
Attorney, Agent, or Firm—Robin, Blecker, Daley & Driscoll

[57] ABSTRACT

A signal processing device for processing an information signal is arranged to detect a signal included in the information signal and appearing during each given blanking period of the information signal in which a plurality of kinds of signals appear in sequence at intervals of the blanking period and the DC level of the information signal is offset according to the kind of a signal appearing during each of the blanking periods, to remove the DC level offset of each blanking period of the information signal by using the signal thus detected, and to identify the kind of signal included in the information signal by using the signal detected. The arrangement facilitates a reduction in size and weight of the device by reducing the number of external elements and the number of external-element connecting terminals.

12 Claims, 4 Drawing Sheets

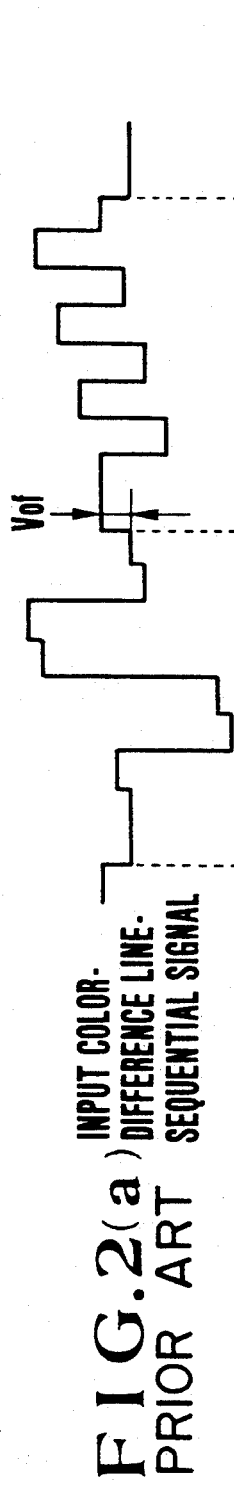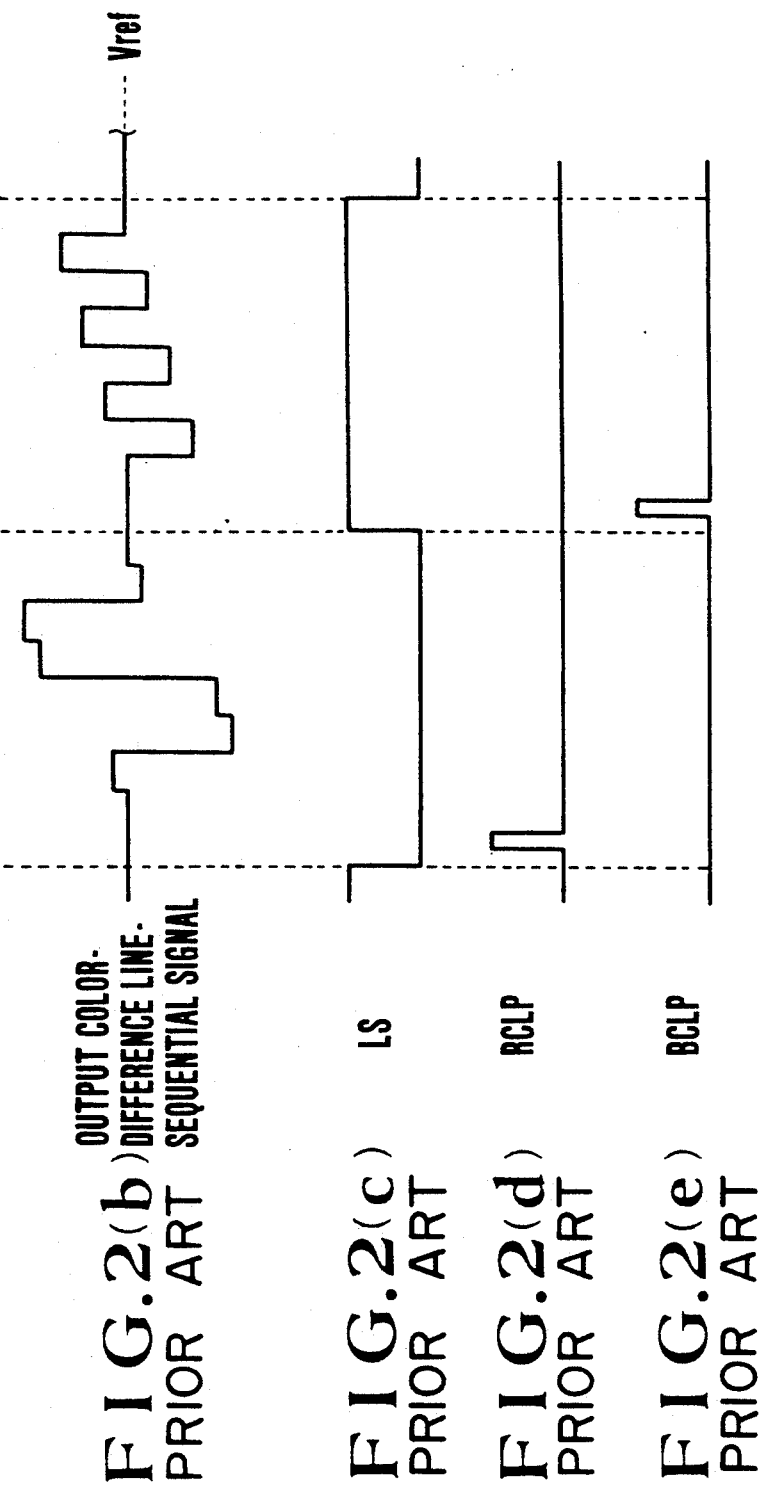
FIG.2(a) PRIOR ART INPUT COLOR-DIFFERENCE LINE-SEQUENTIAL SIGNAL
FIG.2(b) PRIOR ART OUTPUT COLOR-DIFFERENCE LINE-SEQUENTIAL SIGNAL
FIG.2(c) PRIOR ART LS
FIG.2(d) PRIOR ART RCLP
FIG.2(e) PRIOR ART BCLP

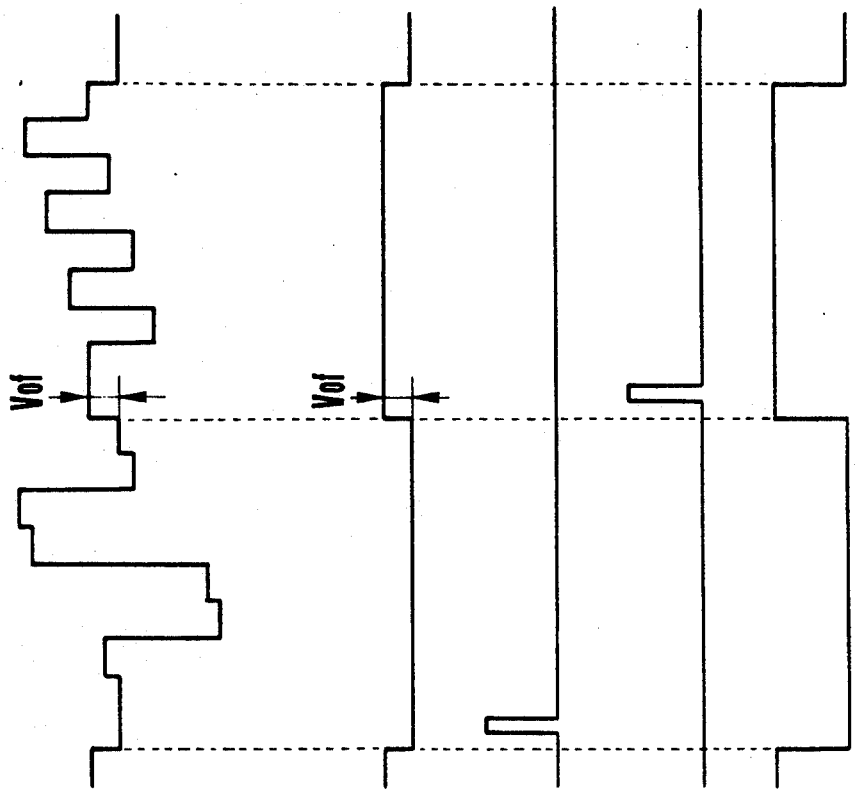

INFORMATION SIGNAL PROCESSING DEVICE FOR OFFSET REMOVAL AND SIGNAL IDENTIFICATION OF COLOR DIFFERENCE SIGNALS

BACKGROUND OF THE INVENTION

1. Field of the Invention

This invention relates to a signal processing device which is arranged to process an information signal.

2. Description of the Related Art

Among known devices of the kind processing information signals, an electronic still video system is arranged to record a still image signal on a magnetic disc and to reproduce the recorded still image signal from the magnetic disc.

The electronic still video system records a color component of the still image signal on the magnetic disc in a state of a color-difference line-sequential signal together with a luminance signal. The color-difference line-sequential signal is formed by line-sequentially processing two color-difference signals (hereinafter referred to as signals R-Y and B-Y).

To draw a distinction between the two color-difference signals R-Y and B-Y, the color-difference line-sequential signal is recorded with a DC offset applied to the signal B-Y in relation to the other signal R-Y. A reproducing apparatus of the electronic still video system, therefore, must be arranged not only to make a discrimination between the signals R-Y and B-Y included in the color-difference line-sequential signal reproduced from the magnetic disc but also to remove the DC offset.

To meet the above-stated requirement, it has been practiced to make a discrimination between the signals R-Y and B-Y included in the color-difference line-sequential signal and to remove the DC offset by means of a signal processing circuit which is arranged as shown in FIG. 1 of the accompanying drawings.

FIG. 1 shows in outline the arrangement of the conventional signal processing circuit. The circuit shown in FIG. 1 is described as follows with reference also to FIGS. 2(a) to 2(e) which show in a timing chart the operation of the circuit. Referring to FIG. 1, the color-difference line-sequential signal (see FIG. 2(a)) is frequency-demodulated by a frequency demodulator (not shown) and is further subject to a deemphasis process at a deemphasis circuit (not shown). The color-difference line sequential signal is then supplied to a terminal PD.

The color-difference line-sequential signal thus inputted to the terminal PD is supplied through a terminal 8c to capacitors C1 and C2 which are arranged as external elements. After the capacitors C1 and C2, the color-difference line-sequential signal is supplied to clamp circuits 1 and 2 through terminals 8a and 8b.

The clamp circuits 1 and 2 operate under the control of control signals RCLP and BCLP which are as shown in FIGS. 2(d) and 2(e). The clamp circuits 1 and 2 are thus arranged to respectively clamp the color-difference line-sequential signal supplied during the high-level periods of the control signals RCLP and BCLP to a reference voltage Vref. The reference voltage Vref is supplied from a reference voltage source 7. A signal outputted from the clamp circuit 1 is supplied to one terminal R of a switch 3. A signal outputted from the other clamp circuit 2 is supplied to the other terminal B of the switch 3.

The switch 3 is arranged to perform a switching action under the control of a switch-over signal LS which is inverted for every horizontal scanning period as shown in FIG. 2(c). For example, the connecting position of the switch 3 is on the side of the terminal B when the level of the switch-over signal LS is high and on the side of the terminal R when the level of the switch-over signal LS is low. As a result of the operation of the switch 3, the color-difference line-sequential signal is outputted from a terminal NOF with the DC offset removed as shown in FIG. 2(b).

The reason for performing the clamping process with the two capacitors and two clamp circuits in the manner described above is as follows: if the clamping process is arranged to be performed with a single capacitor and a single clamp circuit, it is hardly possible to obtain adequate characteristics both for following the DC offset and for holding a potential during each scanning line period at the same time.

The color-difference line-sequential signal inputted to the terminal PD of FIG. 1 is supplied also to sample-and-hold (hereinafter referred to as S/H) circuits 4 and 5. The S/H circuit 4 is arranged to sample the color-difference line-sequential signal during the high-level period of the control signal RCLP and to hold the sampled signal for the low-level period of the control signal RCLP. The other S/H circuit 5 is arranged to sample the color-difference line-sequential signal during the high-level period of the control signal BCLP and to hold the sampled signal for the low-level period of the control signal BCLP.

Capacitors C3 and C4 which are arranged as external elements are connected to the S/H circuits 4 and 5 via terminals 8d and 8e. The capacitors C3 and C4 are provided for the purpose of holding the sampled signals.

With the color-difference line-sequential signal sampled and held in the manner described above, the S/H circuit 4 outputs a voltage signal VDR which indicates the blanking potential of the signal R-Y included in the color-difference line-sequential signal. Meanwhile, the other S/H circuit 5 outputs a voltage signal VDB which indicates the blanking potential of the signal B-Y included in the color-difference line-sequential signal. These voltage signals VDR and VDB are supplied to a comparator 6. The comparator 6 compares the levels of these signals VDR and VDB with each other. The comparator 6 outputs an identification signal CID at a high level if the voltage signal VDR is higher than the voltage signal VDB and at a low level if the voltage signal VDR is lower than the voltage signal VDB.

Further, during the low-level period of the identification signal CID, the operation of the signal processing circuit is in a normal state, which is as follows: The blanking potential of the signal R-Y included in the input color-difference line-sequential signal is sampled and held at the S/H circuit 4. The blanking potential of the signal B-Y is sampled and held at the other S/H circuit 5. Further, the blanking potential of the signal R-Y of the input color-difference line-sequential signal is clamped at the above-stated clamp circuit 1 while the blanking potential of the signal B-Y is clamped at the clamp circuit 2. On the other hand, during the high-level period of the identification signal CID, the operation is in an abnormal state which is as follows: the blanking potential of the signal B-Y included in the input color-difference line-sequential signal is sampled and held at the S/H circuit 4, and that of the signal R-Y is sampled and held at the S/H circuit 5. Further, the blanking potential of the signal B-Y of the input color-difference line-sequential signal is clamped at the clamp circuit 1 while that of the other signal R-Y is clamped at the clamp circuit 2.

Therefore, in a case where the identification signal CID is at a high level thus indicating an abnormal state, the signal processing circuit is brought back to the normal operating state by a switching action which is performed in such a way as to supply the control signal BCLP to the clamp circuit 1 and the S/H circuit 4 and to supply the control signal RCLP to the clamp circuit 2 and the S/H circuit 5.

In accordance with the arrangement of the conventional. signal processing device described above, the four capacitors Cl to C4 must be arranged as external elements (to be attached to the outside of the circuit). Therefore, in order to arrange the signal processing device in the form of an integrated circuit, the circuit must be provided with a total of five external-element connecting terminals for connecting the capacitors Cl to C4. In arranging the integrated circuit, however, it is advantageous to minimize the number of external-element connecting terminals in respect to reduction in size and weight. In other words, use of many elements attached to the outside of the integrated circuit not only increases a space required for assembling the circuit into the device but also increases the weight of the device.

Besides, the possibility of malfunction due to inadequate contact increases accordingly as the number of external-element connecting terminals increases. It is, therefore, preferable to minimize the number of such terminals.

SUMMARY OF THE INVENTION

It is a general object of this invention to provide a signal processing device which is arranged to be capable of solving the above-stated problem.

It is a more specific object of the invention to provide a signal processing device which is arranged to easily permit a reduction in size and weight of the device by reducing the number of external elements and thus by reducing the number of terminals to be used for connecting these external elements.

Under this object, a signal processing device which is arranged as an embodiment of this invention to process an information signal comprises detecting means arranged to receive the information signal including a plurality of kinds of signals which appear in sequence at intervals of a given blanking period and having DC levels during the blanking period which are offset according to the kinds of signals and to detect a signal during each blanking period included in the received information signal; offset removing means for removing the offset of DC levels during each blanking period of the information signal by using the signal detected by the detecting means; and identifying means for identifying the kinds of signals included in the information signal by using the signal detected by the detecting means.

It is another object of the invention to provide a signal processing device which is capable of removing the offset of DC levels during each blanking period of an information signal without having recourse to any clamp circuit.

Under that object, a signal processing device arranged as another embodiment of the invention to process an information signal comprises a sample-and-hold circuit arranged to receive the information signal including a plurality of kinds of signals which appear in sequence at intervals of a given blanking period and having DC levels during the blanking period which are offset according to the kinds of signals, to sample and hold a signal during each blanking period included in the received information signal and to output a sampled and held signal; a subtraction circuit arranged to remove the offset of DC levels during each blanking period of the information signal by subtracting, from the information signal, the signal outputted from the sample-and-hold circuit; and an identifying circuit for identifying the kinds of signals included in the information signal by using the signal outputted from the sample-and-hold circuit.

It is a further object of the invention to provide a signal processing device which is arranged in a simple manner and yet is capable of removing the offset of DC levels during the blanking period of a color-difference line-sequential signal and is also capable of identifying the kinds of color-difference signal components of the color-difference line-sequential signal without recourse to any clamp circuit.

Under the above-stated object, a signal processing device arranged according to this invention to process an information signal comprises a sample-and-hold circuit arranged to receive a color-difference line-sequential signal having DC levels during each blanking period which are offset for every horizontal scanning period, to sample and hold a signal during each blanking period included in the received color-difference line-sequential signal and to output a sampled and held signal; a subtraction circuit arranged to remove the offset of DC levels during each blanking period of the color-difference line-sequential signal by subtracting, from the color-difference line-sequential signal, the signal outputted from the sample-and-hold circuit; and an identifying circuit arranged to identify the kinds of color-difference signals included in the color-difference line-sequential signal by using the signal outputted from the sample-and-hold circuit.

The above and other objects and features of the invention will become apparent from the following detailed description of an embodiment thereof taken in connection with the accompanying drawings.

BRIEF DESCRIPTION OF THE DRAWINGS

FIGS. 2(a) to 2(e) show in a timing chart the operation of the signal processing circuit shown in FIG. 1.

FIGS. 4(a) to 4(e) show in a timing chart the operation of the signal processing circuit shown in FIG. 3.

DETAILED DESCRIPTION OF THE PREFERRED EMBODIMENT

The following describes by way of example the details of this invention through an embodiment thereof.

Figure 1:
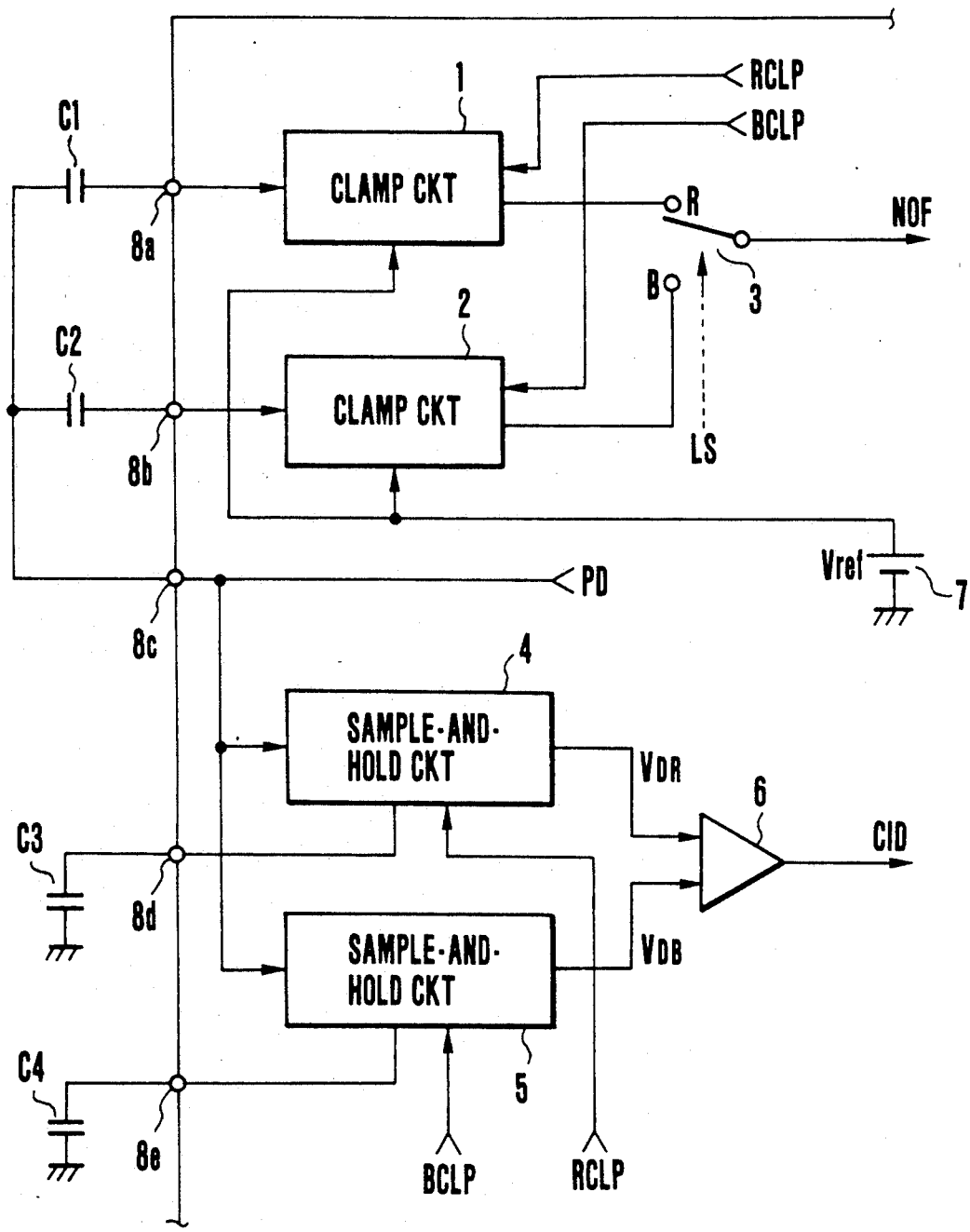
FIG. 1 shows in outline the arrangement of the conventional signal processing circuit.
Figure 3:
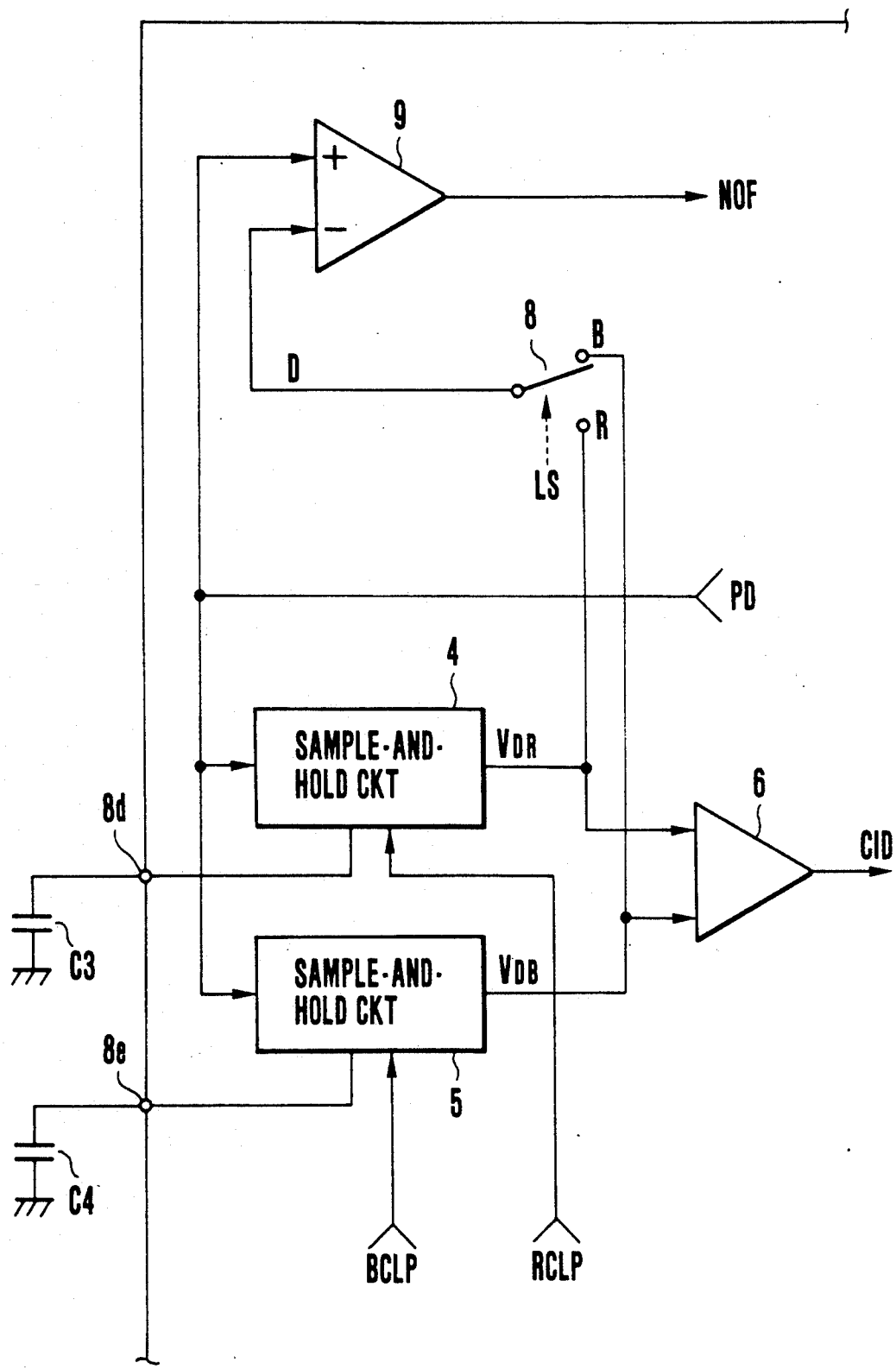
FIG. 3 shows in outline the arrangement of a signal processing circuit which is arranged according to this invention as an embodiment thereof.

FIG. 3 shows in outline the arrangement of a signal processing circuit which is arranged according to this invention as the embodiment thereof. In FIG. 3, parts which are similar to the parts of the circuit shown in FIG. 1 are indicated by the same reference numerals.

The circuit shown in FIG. 3 is described below with reference to FIG. 3 and FIGS. 4(a) to 4(e) which show in a timing chart the operation of the circuit.

Referring to FIG. 3, a color-difference line-sequential signal is frequency-demodulated by a frequency demodulator (not shown) and, after that, is subjected to a deemphasizing process which is performed by a deemphasis circuit (not shown). The color-difference line-sequential signal which is thus processed and is in a form as shown in FIG. 4(a) is supplied to a terminal PD. Further, the color-difference line-sequential signal supplied to the terminal PD has a DC offset Vof.

The input color-difference line-sequential signal is supplied from the terminal PD to the positive terminal of a subtracter 9 and also to sample-and-hold (S/H) circuits 4 and 5. Then, like in the case of the circuit shown in FIG. 1, the S/H circuits 4 and 5 sample and hold the color-difference line-sequential signal, in accordance with control signals RCLP and BCLP which are as shown in FIGS. 4(c) and 4(d), in conjunction with capacitors C3 and C4 serving as external elements which are connected via terminals 8d and 8e to the S/H circuits 4 and 5. The S/H circuit 4 outputs a voltage signal VDR which indicates the blanking potential of a color-difference signal R-Y included in the color-difference line-sequential signal. The S/H circuit 5 outputs a voltage signal VDB which indicates the blanking potential of a color-difference signal B-Y included in the color-difference line-sequential signal. The levels of the voltage signals VDR and VDB are compared with each other by a comparator 6. As a result of the comparison, the comparator 6 outputs an identification signal CID in the same manner as the circuit shown in FIG. 1. Meanwhile, the voltage signal VDR is supplied also to one terminal R of a switch 8 and the other voltage signal VDB to the other terminal B of the switch 8.

The switch 8 is arranged similarly to the switch 3 of FIG. 1 to operate under the control of a switch-over signal LS which is inverted for every horizontal scanning period as shown in FIG. 4(e). The connecting position of the switch 8 is, for example, on the side of the terminal B while the switch-over signal LS is at a high level and on the side of the terminal R while the switch-over signal LS is at a low level. With the switch 8 operating in this manner, a signal D which corresponds to the DC offset component of the color-difference line-sequential signal inputted to the terminal PD is outputted from the switch 8, as shown in FIG. 4(b), and is supplied to the negative terminal of the subtracter 9.

At the subtracter 9, the signal D which is outputted from the switch 8 is subtracted from the color-difference line-sequential signal which is inputted from the terminal PD and has a DC offset Vof. As a result of the subtraction, a color-difference line-sequential signal from which the DC offset Vof has been removed is outputted from a terminal NOF.

Further, the low level of the above-stated identification signal CID represents a normal state. During the low-level period of the identification signal CID thus indicating the normal state, the blanking potential of the signal R-Y of the input color-difference line-sequential signal is sampled and held by the S/H circuit 4 while that of the signal B-Y of the color-difference line-sequential signal is sampled and held by the other S/H circuit 5. During the high-level period of the identification signal CID indicating an abnormal state, the blanking potential of the signal B-Y of the input color-difference line-sequential signal is sampled and held by the S/H circuit 4 while that of the signal R-Y is sampled and held by the S/H circuit 5.

Therefore, when the identification signal CID is at a high level thus indicating an abnormal state, the circuit is arranged to bring the abnormal state back to the normal state by performing a switching action in such a way as to supply the control signal BCLP to the S/H circuit 4, instead of the S/H circuit 5, and to supply the other control signal RCLP to the S/H circuit 5 instead of the S/H circuit 4.

As described in the foregoing, this embodiment is arranged to form a signal through a sample-and-hold action which is performed during the blanking period in making a discrimination between the signals R-Y and B-Y, and to subtract the signal thus formed from the input color-difference line-sequential signal. With the embodiment arranged in this manner, the number of external elements such as capacitors, etc. can be lessened and, accordingly, the number of external-element connecting terminals can be lessened accordingly. Therefore, the arrangement of the embodiment described permits a reduction in size and weight of the signal processing system.

In accordance with this invention, as described in the foregoing, a signal processing device which easily permits a reduction in size and weight can be arranged with a less number of external elements and a less number of external-element connecting terminals than the conventional signal processing device.

What is claimed is:

1. A signal processing device for processing an information signal, comprising:
   a) detecting means arranged to input an information signal including a plurality of kinds of signals which appear in sequence at intervals of a given blanking period and having DC levels during the blanking period which are offset according to the kinds of signals, to detect a signal level during each blanking period of the input information signal at different timings and to output a plurality of detecting signals representing DC levels of the detected signals;
   b) offset removing means for removing the offset of DC levels during each blanking period of the input information signal by using the plurality of detecting signals output from said detecting means; and
   c) identifying means for identifying the kinds of signals included in the input information signals by using the plurality of detecting of detecting signals output from said detecting means.

2. A device according to claim 1, wherein said detecting means includes a sample-and-hold circuit arranged to sample and hold the input information signal during each blanking period of the input information signal at different timings and to output a plurality of sample-and-hold signals representing the levels of the sampled and held signals.

3. A device according to claim 1, wherein said offset removing means includes a subtraction circuit arranged to remove the offset of DC levels during each blanking period of the input information signal by subtracting, from the input information signal, the signal detected by said detecting means.

4. A device according to claim 1, wherein said identifying means is arranged to compare the plurality of detecting signals detected by said detecting means with each other and to identify the kinds of signals included in the input information signal on the basis of a result of the comparison.

5. A signal processing device for processing an information signal, comprising:
   a) sample-and-hold circuit means for processing an input information signal including a plurality of kinds of signals which appear in sequence at intervals of a given blanking period and having DC levels during the blanking period which are offset according to the kinds of signals, to sample and hold a signal during each blanking period of the input information signal at different timings and to output a plurality of sample-and-hold signals representing levels of sampled and held signals;
   b) a subtraction circuit arranged to remove the offset of DC levels during each blanking period of the input information signal by subtracting, from the input information signal, the plurality of sample-and-hold signals output from the sample-and-hold circuit means; and
   c) an identifying circuit arranged to identify the kinds of signals included in the input information signal by using the plurality of sample-and-hold signals output from the sample-and-hold circuit means.

6. A device according to claim 5, wherein said sample-and-hold circuit means is arranged to sample and hold signals during each blanking period of the input information signal.

7. A device according to claim 6, wherein said identifying circuit is arranged to compare with each other the plurality of sample-and-hold signals output from said sample-and-hold circuit means and to output an identification signal corresponding to the kind of each signal included in the input information signal on the basis of a result of the comparison.

8. A signal processing device for processing an information signal, comprising:
   a) sample-and-hold circuit means for processing an input color-difference line-sequential signal having DC levels during each blanking period which are offset for every horizontal scanning period, to sample and hold a signal during each blanking period included in the input color-difference line-sequential signal at different timings and to output a plurality of sample-and-hold signals representing levels of sampled and held signals;
   b) a subtraction circuit arranged to remove the offset of DC levels during each blanking period of the input color-difference line-sequential signal by subtracting, from the input color-difference line-sequential signal, the plurality of sample-and-hold signals output from said sample-and-hold circuit means; and
   c) an identifying circuit arranged to identify the kinds of color-difference signals included in the input color-difference line-sequential signal by using the plurality of sample-and-hold signals output from said sample-and-hold circuit means.

9. A device according to claim 8, wherein said sample-and-hold circuit means includes:
   1) a first sample-and-hold circuit arranged to sample and hold, at a first timing, a signal during the blanking period included in the input color-difference line-sequential signal and to output a first sample-and-hold signal representing a level of the sampled and held signal; and
   2) a second sample-and-hold circuit arranged to sample and hold, at a second timing different from the first timing, a signal during the blanking period included in the input color-difference line-sequential signal and to output a second sample-and-hold signal representing a level of the sampled and held signal.

10. A device according to claim 9, wherein said subtraction circuit is arranged to remove the offset of the DC levels during each blanking period of the input color-difference line-sequential signal by subtracting, from the color-difference line-sequential signal, a signal obtained by switching between the first sample-and-hold signal output from said first sample-and-hold circuit and the second sample-and-hold signal output from said second sample-and-hold circuit.

11. A device according to claim 9, wherein said identifying circuit is arranged to compare the first sample-and-hold signal outputted from said first sample-and-hold circuit with the second sample-and-hold signal outputted from said second sample-and-hold circuit and to output an identification signal corresponding to the kind of each color-difference signal included in the input color-difference line-sequential signal on the basis of a result of the comparison.

12. A device according to claim 9, wherein said first sample-and-hold circuit includes a first connection terminal for connecting a first external capacitor, and wherein said second sample-and-hold circuit includes a second connection terminal for connecting a second external capacitor.

* * * * *

UNITED STATES PATENT AND TRADEMARK OFFICE
CERTIFICATE OF CORRECTION

PATENT NO. : 5,249,063
DATED : September 28, 1993
INVENTOR(S) : Katsumi Arisaka

It is certified that error appears in the above-indentified patent and that said Letters Patent is hereby corrected as shown below:

Col. 6, line 25.  Change "less" to -- lesser -- (both occurrences)
Col. 6, line 47.  Change "signals" to -- signal --
Col. 6, line 48.  Delete "of detecting" (second occurrence)
Col. 7, line 31.  Delete "each"
Col. 8, line 25.  Delete "the"

Signed and Sealed this

Nineteenth Day of April, 1994

Attest:

BRUCE LEHMAN

Attesting Officer  Commissioner of Patents and Trademarks